United States Patent
Boldyrev et al.

(10) Patent No.: US 8,872,448 B2
(45) Date of Patent: Oct. 28, 2014

(54) APPARATUS AND METHOD FOR REORIENTATION DURING SENSED DROP

(75) Inventors: Sergey Boldyrev, Soderkulla (FI); Mikko Uusitalo, Helsinki (FI); Alexander V. Ptchelintsev, Espoo (FI); Jari-Jukka H. Kaaja, Jarvenpaa (FI); Ian Oliver, Soderkulla (FI)

(73) Assignee: Nokia Corporation, Espoo (FI)

( * ) Notice: Subject to any disclaimer, the term of this patent is extended or adjusted under 35 U.S.C. 154(b) by 310 days.

(21) Appl. No.: 13/404,469

(22) Filed: Feb. 24, 2012

(65) Prior Publication Data
US 2013/0226754 A1    Aug. 29, 2013

(51) Int. Cl.
*H02K 33/00*    (2006.01)

(52) U.S. Cl.
USPC .......................... 318/129; 318/114; 318/128

(58) Field of Classification Search
USPC ................ 318/129, 114, 128, 119, 135, 686; 310/81, 89
See application file for complete search history.

(56) References Cited

U.S. PATENT DOCUMENTS

| 7,382,567 B2 | 6/2008 | Liao et al. ........................ 360/75 |
| 2007/0253087 A1* | 11/2007 | Lee .................................. 360/69 |
| 2008/0284074 A1* | 11/2008 | Lim et al. ....................... 267/136 |
| 2013/0073095 A1 | 3/2013 | King et al. ...................... 700/279 |

OTHER PUBLICATIONS

EE Times, "Accelerometers and Fee-Fall Detection Protects Data and Drives", (2012), (4 pages).
Motorola, "Motorola Interactive Sensor Technology (IST): Enterprise-Class Motion Sensing for Motorola Handheld Mobile Computer", (2009), (8 pages).
"Method and Apparatus for Detecting Free Fall of Mobile Device and Recording Medium Storing Computer Program for Executing the Method", (2005), (1 page), Abstract.
Kim, et al, "System and Method for Detection of Freefall With Spin Using Two Tri-Axis Accelerometers", (2008), (4 pages).
Horwitz, "ShieldZone InvisibleShield Full Body Shield for Apple iPhone", (2007), (8 pages).

\* cited by examiner

*Primary Examiner* — Karen Mash
(74) *Attorney, Agent, or Firm* — Harrington & Smith (57) ABSTRACT

An apparatus including at least one vibrator motor for vibrating the apparatus; a controller connected to the at least one vibrator motor; and at least one sensor connected to the controller. The at least one sensor is configured to sense drop motion of the apparatus. The controller is configured to control the at least one vibrator motor to change orientation of the apparatus during a portion of the drop motion.

17 Claims, 5 Drawing Sheets

APPARATUS AND METHOD FOR REORIENTATION DURING SENSED DROP

BACKGROUND

1. Technical Field

The exemplary and non-limiting embodiments of the invention relate generally to drop protection and, more particularly, to reducing damage to an apparatus if dropped.

2. Brief Description of Prior Developments

Some electronic devices with hard disk drives sense falling, and trigger a free fall sensing procedure to park the heads to the ramp thereby preventing from platters being scratched before the impact. This can lessen potential hard disk drive damage and data loss. Portable hand-held devices, such as a smart phone for example, are prone to damage if dropped. For example, the glass on the display screen may become cracked or a housing member may break.

SUMMARY

The following summary is merely intended to be exemplary. The summary is not intended to limit the scope of the claims.

In accordance with one aspect, an apparatus is provided including at least one vibrator motor for vibrating the apparatus to alert a user of a predetermined event; a controller connected to the at least one vibrator motor; and at least one sensor connected to the controller. The at least one sensor is configured to sense drop motion of the apparatus. The controller is configured to control the at least one vibrator motor to change orientation of the apparatus during a portion of the sensed drop motion.

In accordance with another aspect, a method comprises, based upon a general drop motion of an apparatus, sending at least one signal by at least one sensor of the apparatus to a controller of the apparatus; and moving at least one vibrator signaling motor of the apparatus by the controller based upon the at least one signal to thereby change an orientation of the apparatus during a portion of the sensed drop motion.

In accordance with another aspect, a non-transitory program storage device is provided, readable by a machine, tangibly embodying a program of instructions executable by the machine for performing operations, where the operations comprise determining by a controller if an apparatus is in a general drop state of motion based upon at least one signal from at least one sensor of the apparatus; and sending at least one signal from the controller to at least one vibration signaling motor of the apparatus to change orientation of the apparatus during the general drop state of motion by movement of the vibration signaling motor.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
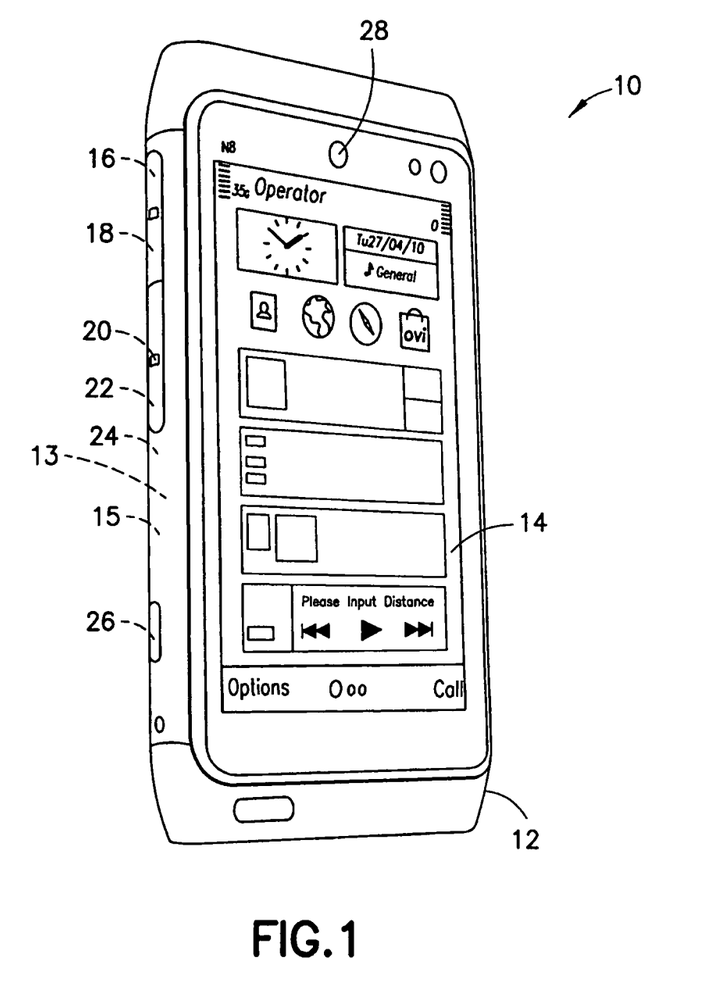
FIG. 1 is a perspective view of an example apparatus.

Referring to FIG. 1, there is shown a perspective view of an apparatus 10 according to an example embodiment. In this example the apparatus 10 is a hand-held portable apparatus comprising various features including a telephone application, Internet browser application, camera application, video recorder application, music player and recorder application, email application, navigation application, gaming application, and/or any other suitable electronic device application. The apparatus may be any suitable portable electronic device, such as a mobile phone, ultra mobile computer, smartphone, tablet, PDA, etc. for example.

Figure 2:
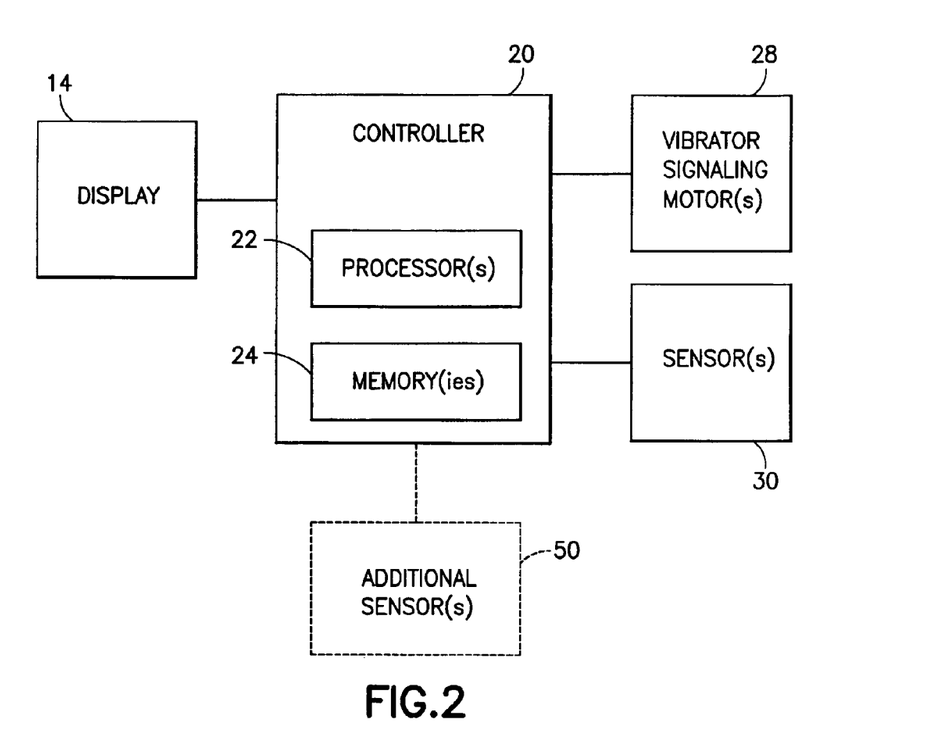
FIG. 2 is a diagram illustrating some components of the apparatus shown in FIG. 2.

The apparatus 10, in this example embodiment, comprises a housing 12, a touch screen display 14 which functions as both a display and a user input, and electronic circuitry 13 including a printed wiring board having at least some of the electronic circuitry thereon. The display 14 need not be a touch screen. The electronic circuitry can include, for example, a receiver 16, a transmitter 18, and a controller 20. Referring also to FIG. 2, the controller 20 may include at least one processor 22, at least one memory 24, and software. A rechargeable battery 26 is also provided.

As seen in FIG. 2, the apparatus 10 includes at least one vibratory signaling motor 28. The motor(s) 28 are adapted to be actuated by the controller 20 to vibrate the apparatus 10. This vibration is used to signal the user of a predetermined event, such as an incoming telephone call or text message for example.

Figure 3:
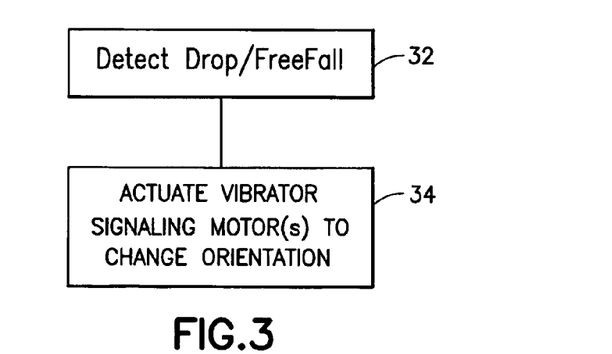
FIG. 3 is a diagram illustrating some steps of an example method.

The apparatus 10 also includes one or more sensors 30 as part of a damage control system as further described below. One or more of the sensor(s) 30 may also be used for additional functions of the apparatus. Referring also to FIG. 3, as indicated by block 32 the apparatus 10 is configured to detect a drop or free fall state of motion of the apparatus 10. This is done by use of the sensor(s) 30 and the controller 20. The sensor(s) could comprise, for example, an accelerometer. One or more signals from the sensor(s) 30 are sent to the controller 20 during a free fall or drop of the apparatus 10. As indicated by block 34, the controller 20, based upon these signal(s), is able to actuate the vibrator signaling motor(s) 28 to change the orientation of the apparatus during a portion of the drop/free fall. In particular, the controller 20 is configured to change the orientation of the apparatus as the apparatus is dropping/falling to move a specific portion or surface of the apparatus 10 towards the leading edge of the apparatus; such that the specific portion/surface is moved to become at least a portion of the leading edge.

Figure 4:
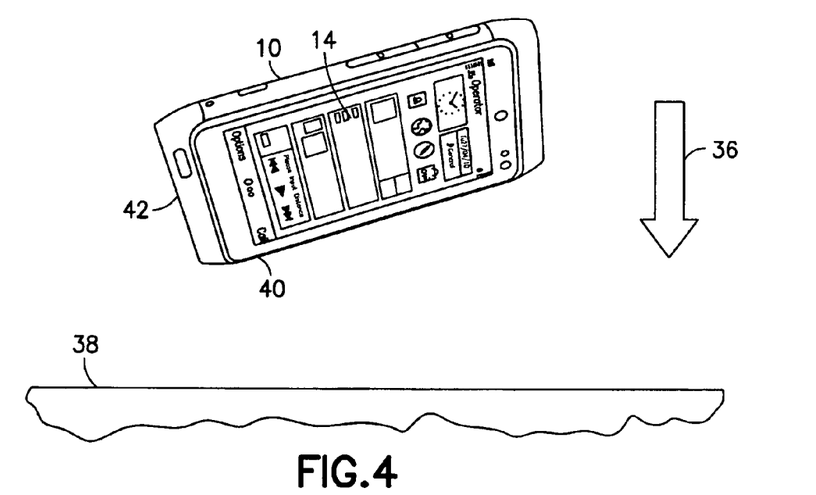
FIG. 4 is a diagram illustrating the apparatus shown in FIG. 1 in a free fall or drop state of motion.
Figure 5:
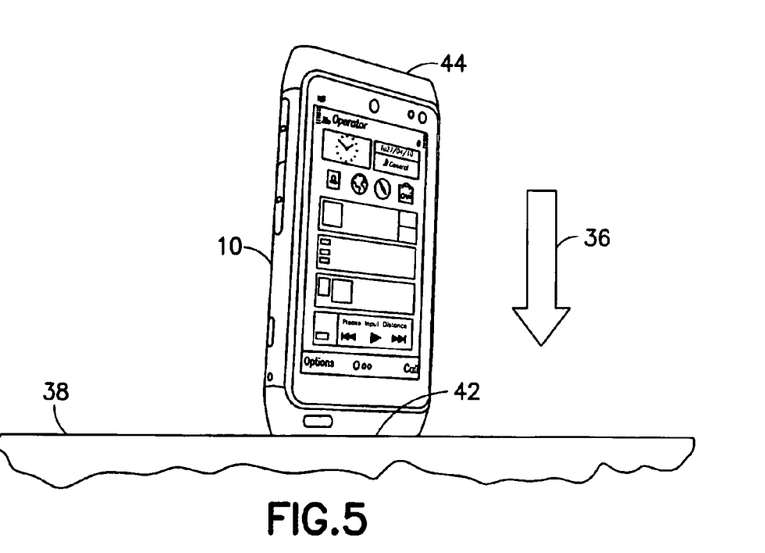
FIG. 5 is a diagram similar to FIG. 4, but showing the apparatus having been re-orientated before it hits the ground.

Referring also to FIGS. 4 and 5, FIG. 4 illustrates the apparatus 10 being dropped or falling as indicated by arrow 36. The apparatus 10 is moving towards the ground or surface 38. There is always some probability that a hand-held device or other similar item, such as a ultra-mobile computer for example, may fall from a height and become damaged. In mobile phones especially the display 14 might not tolerate hitting anything hard. The damage control system of the apparatus 10 is configured to change the orientation of the apparatus (if necessary) to help minimize damage to the apparatus 10. As illustrated by FIG. 5, in this example, during the drop/fall the apparatus changes the orientation. Previously, as illustrated by FIG. 4, the surface 40 was the leading edge of the apparatus approaching the ground 38. However, with implementation of the damage control system, the orientation of the apparatus 10 is changed such that the surface 42 becomes the leading edge as the apparatus contacts the ground 38. The design of the apparatus 10 is such that less damage is likely to occur for a distance of about 3 meters or less if the surface 42 hits the ground 38 versus a larger amount of damage if surface 40 hits the ground 38.

Figure 6:
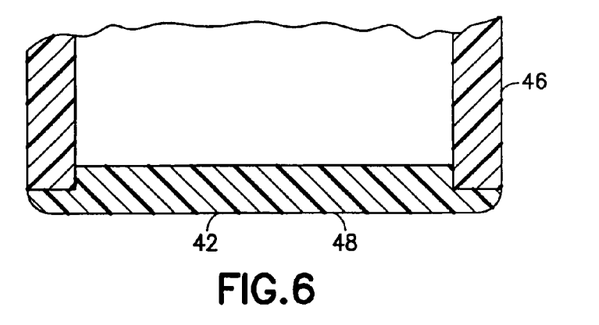
FIG. 6 is a partial cross sectional view illustrating an example of a shock absorber.

The ability of the surface 42 to hit the ground 38, and have less possibility of damage to the apparatus (or less severe damage) verses other surfaces (such as a corner for example), may be inherent. Alternatively one or more surfaces/areas of the exterior of the apparatus (such as 42 and 44 for example) may be enhanced such that when they hit the ground 38 less damage is likely. For example, as seen in FIG. 6, the housing 12 may comprise a first housing member 46 and a second housing member 48. The second housing member 48 may form the surface 42. The first housing member 46 is a more rigid material than the material of the second housing member, such as rigid plastic for example. The second housing member 48 may be comprised of a resilient polymer material or rubber for example. As another alternative, the second housing member 48 may comprise multiple members, such as a combination of rigid and resilient materials and/or a spring. The key feature in this example, however, is that the second housing member 48 is able to withstand a hit (such as being dropped on the ground) and resiliently absorb at least some of that impact energy to prevent or at least reduce damage to the apparatus 10, such as preventing the glass on the display 14 from breaking or the housing 12 from cracking.

The sensor(s) 30, such as an accelerometer for example, are configured to send signal(s) to the controller 20. The controller 20 is configured to use those signals to determine if the damage control system should be activated. In one example the controller 20 determines, based upon the signals from the sensor(s) 30, if the apparatus 10 has been dropped or is in a general free fall state of motion. For example, the controller could be programmed, based upon an accelerometer signal indicating an acceleration of about 32 ft/sec$^2$ (about 9.81 m/s$^2$) in other words about equal to gravity or greater acceleration, that the apparatus has been dropped. With this determination, the controller 20 can then actuate the vibration signaling motor(s) 28 to change the orientation of the apparatus 10 such that the surface 42 becomes the leading edge of the apparatus.

In one example embodiment, the apparatus 10 is able to determine its orientation or posture (such as relative to the pull of gravity for example), such as with an orientation sensor(s) (yaw, pitch, roll for example), which orientation sensor(s) may be one or more of the sensors 30, or an additional sensor(s) 50 (see FIG. 2). The controller 20 can use signals from the orientation sensor(s) to determine the orientation of the apparatus 10, and determine how the controller 20 needs to controller the motor(s) 28 to move the desired surface (such as surface 42 for example) to become the leading edge of the apparatus.

Figure 7:
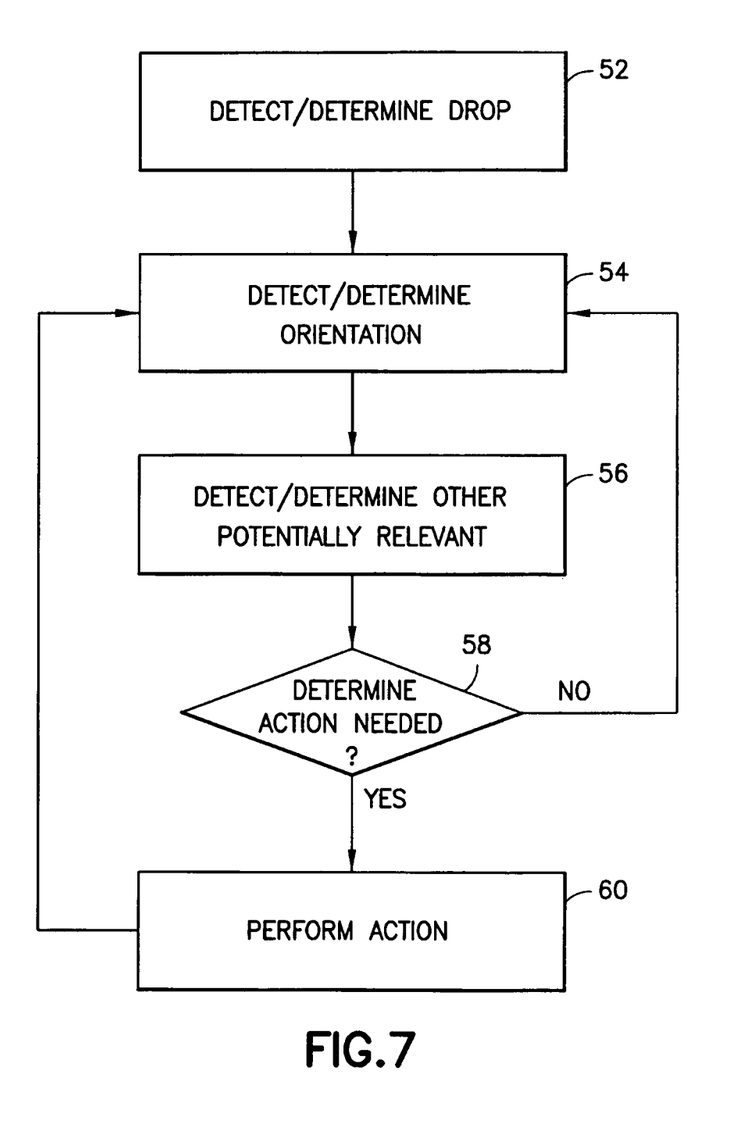
FIG. 7 is a diagram illustrating some steps of an example method.

Referring also to FIG. 7, an example method is illustrated comprising detecting and/or determining if the apparatus 10 has been dropped (or otherwise is in a substantial free fall or projection state of motion such as accelerating at 9.8 m/s$^2$ or more) as indicated by block 52. Detecting and/or determining, as indicated by block 54, the orientation or posture of the apparatus 10; such as where one or more predetermined surfaces are relative to the leading edge of the apparatus. Detecting and/or determining, as indicated by block 56, any other potentially relevant information, such as by use of additional sensor(s) 50 for example. Determining, as indicated by block 58, if action is needed by the damage control system to change the orientation or posture of the apparatus to reduce risk of damage. If action is needed, as indicated by block 60 the controller 20 can control the motors 28 to attempt to re-orientate the apparatus, and go back to block 54 to detect/determine the orientation/posture again. With multiple motors, they can be operated synchronously, in order to increase their collective effect. If action is not needed, then the process can merely go back to block 54 in case the situation has changed.

Figure 8:
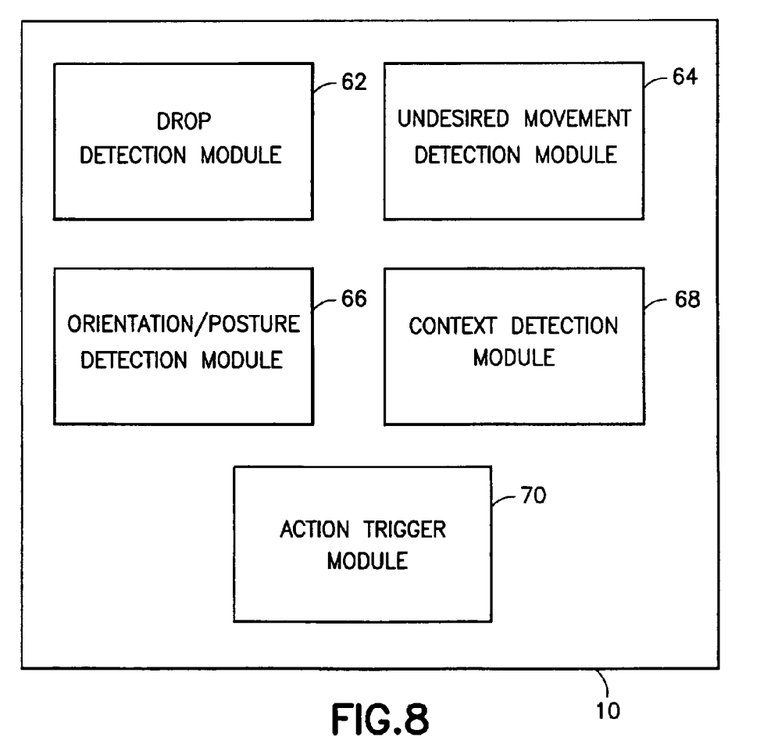
FIG. 8 is a diagram illustrating functional modules of the apparatus shown in FIG. 1.

As illustrated by FIG. 8, from a function standpoint the apparatus 10 can comprise a drop detection module 62, an undesired movement detection module 64, an orientation/posture detection module 66, a context detection module 68 and an action trigger module 70. These modules may comprise various hardware and software for example, and may have at least some common elements. The undesired movement detection module 64 could, for example, be used to sense/determine lateral trajectory motion for example. The context detection module 68 could be used to turn off the damage control system, such as when the user places the apparatus in an airplane mode of operation for example.

One issue which has become significant due to the growing complexity of portable devices, is damage to such a device during its lifetime. One of the major reasons is damage due to free fall or drop that may occasionally happen during its lifetime. Thus, a solution in order to increase the lifetime value by means of a preventive action, and to minimize the maintenance costs incurred by the repair at vendors care/repair centers, will be attractive to purchasers. In modern service oriented markets it should be attractive, and thus valuable to the end customer, to have a technological enabler in the form of a damage prevention service to increase the number of services available for sale, and provide a substantial growth of customers.

The example approach described herein may be targeted to increase the lifetime value of a device, and to reduce the risks of damage. Thus, this can reduce the repair and maintenance costs during the device lifetime by means of preventive actions during the occasional free fall/drop. One example approach is to sense free falling (or other situational context which could possibly cause damage, such as being thrown out of the hand of a person due to slippery surface), sense the posture and trajectory of the device, sense the context and potential other objects around, and change the posture during the free fall or drop with the help of one or more DC motors (also known as "vibro" or "vibra" motors) of the device to lessen the likelihood of damage to the device.

In order to efficiently utilize the DC motor(s), the DC motor can be placed at a location of the apparatus where the biggest momentum could be created in order to turn the device during a fall. The mobile device may be designed such that a particular part of the device can tolerate better receiving a hit (e.g. hitting the ground). Thus, features may be designed to ensure that the device lands on or hits on the tolerable part. The change of posture aims to ensure that the device lands on this tolerable part first. Such an edge/surface would be made of deforming material that would return to its original form. Such materials can be soft enough to absorb energy, but strong enough to not permanently deform (i.e. not break). In order to prevent a more fragile member from hitting the ground first, a turn of the apparatus by 90 degrees would be enough in most situations. For example, in a smart phone a worst possible initial posture would be the display fully down. The system could be configured to rotate the apparatus 90 degrees to protect the display the most.

Another aspect could be to enable subscription for the end user in order to activate and utilize the service/method; which could otherwise be inactive. By making enablement of this method a subscription, a vendor or service supplier could increase the added value of service propositions, and engage more customers to utilize the service. Such service extends the consumer lifetime value and reduce the costs associated with repair and care.

Another aspect is that the service can be utilized for third party merchandising; promotion actions. For example, a certain retail chain can have a promotional action and engage the customers to activate and compare the user experience of dropping an apparatus with the service activated versus dropping the apparatus without the service activated. Thus, the subscription can be utilized in an advertizing framework in order to provide further monetization of the service.

Another aspect is that the service can be location bounded, with inherent navigation and routing features. For example, the service/method may be deactivated at home overnight when the device's owner/user is at home, or kept active if not.

Another aspect is that the service can be integrated with gaming features and/or within a game framework, such as a hand-held game or game controller.

A device could use different methods to find suitable information to help in determining how to change the posture. For example, the device could use radar to detect distance to the ground and/or other objects. As another example, the device could use one or more accelerometers to detect the posture and detect free falling. By concentrating weight in the device near an edge that can tolerate a hit for best protection of the device, damage to more vulnerable parts such as the display could be prevented.

If the hand-held portable electronic device were dropped from a height of about one meter (about 3 feet), with an initial velocity of zero, it would take about 0.45 seconds to hit the ground. Assuming that a one meter drop might damage the device, 0.45 seconds is enough time to use features described herein. The average switch to service interrupt routine (in software) when it is called due to a free-fall sensor signal is 2-5 µs (micro seconds). The remaining time could be used for preventive actions as described herein.

Due to a lack of time after detecting a fall/drop, there would be insufficient time to establish a new connection to a cellular base station or a Wireless Local Area Network (WLAN) Access Point (AP). The device would need to try to manage with the connections established at the moment of falling for transmitting backup data. With cellular connectivity, it would take some time to have a slot in the uplink; depending on the congestion. In a WLAN, one would not need to reserve a slot, but one could not transmit if the channel(s) would be reserved. If a channel would be silent, a WLAN could transmit right away. In both cellular and WLAN the transmission could be in the form of a data package to a secure server in the Internet. The data to be transmitted could be selected beforehand to contain (e.g.: most recent changes after latest backup, and/or any critical information selected beforehand, such as current calendar inputs).

Features described herein may provide advantages such as reducing the costs associated with repair and maintenance, increasing the lifetime value of the device and, thus, increasing the consumer lifetime value, and the "Wow" effect or surprise from consumers from the clearly reduced likelihood for the device and especially the vulnerable parts to be damaged by accidental falling/drop.

Features described herein may provide a system and method for the service enabled subscription management for positioning during controllable drop of mobile device in order to prevent its damage. An idea is that a device's free fall can be partially controlled by vibration motors. Duration of the free fall from 1.5 m is about 0.5 sec. Maximum amplitude of the unbalanced exciting force created by the motor is $F = m\, r\, w^2$, where F—force (N)
m—rotor's mass (kg)
r—eccentricity (m)
w—angular rotating speed (rad/sec)

Vibro motors are replaced by two forces applied to the simplified device model (m=100 g) in opposite directions. In one example m=0.43 g
r=1.75 mm
w=1250 rad/s
(12000 rpm)

Exciting force is sufficient to change orientation of the device. Thus, vibration motors can be used for controlling orientation of mobile devices during a free fall.

In one example embodiment the apparatus 10 could comprise a radio-frequency (RF) memory tag as an embedded sensor, or there could be an embedded tag which could collect data before a hit occurs such as when a radar or other sensor has triggered or determined falling activity for example. This could be a pre-hit data-logger. This could be one of the memories 24 for example, or a separate tag connected to the controller 20.

An example apparatus 10 may comprise at least one vibrator motor 28 for vibrating the apparatus to alert a user of a predetermined event; a controller 20 connected to the at least one vibrator motor; and at least one sensor 30 connected to the controller, where the at least one sensor is configured to sense drop motion of the apparatus. The controller is configured to control the at least one vibrator motor to change orientation of the apparatus during a portion of the sensed drop motion. The controller may be configured to change the orientation of the apparatus such that a predetermined surface 42 of the apparatus is at a leading side of the apparatus at an end of the sensed drop motion. The apparatus may comprise a shock absorber 48 at the predetermined surface. The shock absorber may comprise a first member of a housing of the apparatus having a material more resilient than material of other members of the housing. The at least one sensor 30 may comprise a sensor configured to sense general free fall motion of the apparatus. The at least one sensor 30 may comprise a sensor configured to sense trajectory of the apparatus. The apparatus 30 may further comprise an orientation sensor 50 connected to the controller, where the controller is configured to control the at least one vibrator motor to change orientation of the apparatus based upon both the at least one sensor and the orientation sensor. The apparatus may further comprise a near-object sensor 50 connected to the controller configured to sense objects near the apparatus, where the controller is configured to control the at least one vibrator motor to change orientation of the apparatus based upon both the at least one sensor and the near-object sensor. The at least one sensor 30 may comprise an accelerometer. The apparatus 10 may be a hand-held portable electronic device comprising a display screen.

One example method comprises, based upon a general drop motion of an apparatus, sending at least one signal by at least one sensor of the apparatus to a controller of the apparatus; and moving at least one vibrator signaling motor of the apparatus by the controller based upon the at least one signal to thereby change an orientation of the apparatus during a portion of the sensed drop motion.

The at least one sensor may comprise an accelerometer, where the signal is sent from the accelerometer when acceleration is sensed of about 9.8 m/s² or more. The controller 20 may move the at least one vibrator signaling motor 28 such that a predetermined surface 42 of the apparatus is at a leading side of the apparatus at an end of the sensed drop motion. The at least one sensor may comprise a sensor which senses general free fall motion of the apparatus. The at least one sensor may comprise a sensor which senses trajectory of the apparatus. The apparatus may comprise an orientation sensor connected to the controller, where the controller controls the at least one vibrator signaling motor to change the orientation of the apparatus based upon both the at least one sensor and the orientation sensor. The apparatus may comprise a near-object sensor connected to the controller sensing objects near the apparatus, where the controller controls the at least one vibrator motor to change the orientation of the apparatus based upon signal from both the at least one sensor and the near-object sensor. Changing the orientation of the apparatus during the portion of the sensed drop motion may be allowed only after the apparatus receives a pre-authorization code from a service supplier to allow the change. The method may comprise sending a pre-authorization code from a service supplier to an apparatus; and charging a user a fee for sending the pre-authorization.

In one example a non-transitory program storage device may be provided such as memory 24 or a network drive or server memory or memory module for example, readable by a machine, tangibly embodying a program of instructions executable by the machine for performing operations, the operations comprising determining by a controller if an apparatus is in a general drop state of motion based upon at least one signal from at least one sensor of the apparatus; and sending at least one signal from the controller to at least one vibration signaling motor of the apparatus to change orientation of the apparatus during the general drop state of motion by movement of the vibration signaling motor.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
at least one vibrator motor for vibrating the apparatus;
a controller connected to the at least one vibrator motor; and
at least one sensor connected to the controller, where the at least one sensor is configured to sense a drop motion of the apparatus, and
where the controller is configured to control the at least one vibrator motor to change orientation of the apparatus during a portion of the drop motion, where the controller is configured to change the orientation of the apparatus such that a predetermined surface of the apparatus is at a leading side of the apparatus at an end of the drop motion, and where the apparatus comprises a shock absorber at the predetermined surface.

2. An apparatus as in claim 1 where the shock absorber comprises a first member of a housing of the apparatus having a material more resilient than material of other members of the housing.

3. An apparatus as in claim 1 where the at least one sensor comprises a sensor configured to sense general free fall motion of the apparatus.

4. An apparatus as in claim 1 where the at least one sensor comprises a sensor configured to sense a trajectory of the apparatus.

5. An apparatus as in claim 1 further comprising an orientation sensor connected to the controller, where the controller is configured to control the at least one vibrator motor to change orientation of the apparatus based upon both the at least one sensor and the orientation sensor.

6. An apparatus as in claim 1 further comprising a near-object sensor connected to the controller configured to sense objects near the apparatus, where the controller is configured to control the at least one vibrator motor to change orientation of the apparatus based upon both the at least one sensor and the near-object sensor.

7. An apparatus as in claim 1 where the at least one sensor comprises an accelerometer.

8. An apparatus as in claim 1 where the apparatus is a portable electronic device comprising a display screen.

9. A method comprising:
based upon a drop motion of an apparatus, sending at least one signal by at least one sensor of the apparatus to a controller of the apparatus; and
moving at least one vibrator signaling motor of the apparatus by the controller, based upon the at least one signal, to change an orientation of the apparatus by movement the at least one vibrator signaling motor during a portion of the drop motion, where the controller moves the at least one vibrator signaling motor such that a predetermined surface of the apparatus is at a leading side of the apparatus at an end of the drop motion, and where the apparatus comprises a shock absorber at the predetermined surface.

10. A method as in claim 9 where the at least one sensor comprises an accelerometer, and where the signal is sent from the accelerometer when acceleration is sensed of at least about 9.8 m/s².

11. A method as in claim 9 where the at least one sensor comprises a sensor which senses free fall motion of the apparatus.

12. A method as in claim 9 where the at least one sensor comprises a sensor which senses a trajectory of the apparatus.

13. A method as in claim 9 where the apparatus comprises an orientation sensor connected to the controller, where the controller controls the at least one vibrator signaling motor to change the orientation of the apparatus based upon both the at least one sensor and the orientation sensor.

14. A method as in claim 9 where the apparatus comprises a near-object sensor connected to the controller sensing objects near the apparatus, where the controller controls the at least one vibrator motor to change the orientation of the apparatus based upon a signal from both the at least one sensor and the near-object sensor.

15. A method as in claim 9 where changing the orientation of the apparatus during the portion of the drop motion is allowed only after the apparatus receives a pre-authorization code from a service supplier to allow the change.

16. A method comprising:
sending the pre-authorization code as in claim 15 from a service supplier to the apparatus; and
charging a user a fee for sending the pre-authorization.

17. A non-transitory program storage device readable by a machine, tangibly embodying a program of instructions executable by the machine for performing operations, the operations comprising:

determining by a controller if an apparatus is in a general drop state of motion based upon at least one signal from at least one sensor of the apparatus; and sending at least one signal from the controller to at least one vibration signaling motor of the apparatus to change orientation of the apparatus during the drop state of motion by movement of the vibration signaling motor, where the controller causes the orientation of the apparatus to change such that a predetermined surface of the apparatus is at a leading side of the apparatus at an end of the drop motion, and where the apparatus comprises a shock absorber at the predetermined surface.

* * * * *